United States Patent [19]

Kruzich et al.

[11] 4,368,406
[45] Jan. 11, 1983

[54] LAMP DIMMER CONTROL WITH INTEGRAL AMBIENT SENSOR

[75] Inventors: Joseph K. Kruzich, Ann Arbor; Sidney R. Fletcher, Franklin, both of Mich.

[73] Assignee: Ford Motor Company, Dearborn, Mich.

[21] Appl. No.: 220,630

[22] Filed: Dec. 29, 1980

[51] Int. Cl.³ .......................................... H05B 37/02
[52] U.S. Cl. .............................. 315/158; 250/214 AL; 250/239; 315/77; 315/156; 315/291
[58] Field of Search ................. 315/77, 156, 158, 208, 315/291, DIG. 4; 323/905; 250/205, 214 D, 214 AL, 239

[56] References Cited

U.S. PATENT DOCUMENTS

| | | | |
|---|---|---|---|
| 3,371,241 | 2/1968 | Amacher | 315/77 |
| 3,416,032 | 12/1968 | Jahns et al. | 315/158 X |
| 4,118,654 | 10/1978 | Ohta et al. | 315/158 X |
| 4,125,767 | 11/1978 | Silver | 315/158 X |

Primary Examiner—Eugene R. LaRoche
Attorney, Agent, or Firm—Paul K. Godwin, Jr.; Clifford L. Sadler

[57] ABSTRACT

A lamp dimmer control utilizing a variable resistor and an associated adjustment mechanism having an ambient light sensor mounted integral to the control so as to receive ambient light external to the control housing via a translucent adjustment mechanism. Constant contrast illumination control is achieved by pulse width modulation techniques in accordance with the output of the variable resistance setting and the output of the ambient light sensor.

8 Claims, 4 Drawing Figures

U.S. Patent  Jan. 11, 1983  Sheet 1 of 2  4,368,406

LAMP DIMMER CONTROL WITH INTEGRAL AMBIENT SENSOR

CROSS REFERENCE TO RELATED APPLICATIONS

The present invention is related to our copending U.S. patent application Ser. No. 220,631, entitled "Internally Illuminated Multi-Position Switch" and filed concurrently herewith.

BACKGROUND OF THE INVENTION

1. Field of the Invention

The present invention is directed to the field of electrical dimming controls and more specifically, to those controls associated with vehicular instrument panel illumination.

2. Description of the Prior Art

In the simplest configuration, vehicular panel dimming controls often include a manually adjustable variable resistor connected in series with an associated illuminating lamp load to supply a selected amount of voltage thereto. Some also include an on-off switch for supplying power to auxiliary loads such as reading or dome/interior lamps.

Other dimmer control configurations, such as that shown in U.S. Pat. No. 3,371,241, utilize pulse-width modulation circuitry to supply varying duty cycles to the controlled load, in accordance with the setting of a variable resistor.

In each of the prior art systems, the power supplied to the controlled load is substantially constant for each selectable resistance value. In a vehicle environment where a dimmer control is used to select the intensity of illumination on various instruments and gauges, numerous manual readjustments are required to maintain a comfortable contrast from the time the instrument illumination is turned on at dusk as opposed to later at night in complete darkness.

SUMMARY OF THE INVENTION

The present invention is intended to improve the controls of the prior art by providing an adjustable lamp dimmer that includes an internally mounted ambient light sensor utilized in conjunction with a variable resistor to provide information to pulse width modulation circuitry. A variable power level output is thereby provided that maintains a relatively constant illumination contrast with respect to the ambient light levels.

It is another object of the present invention to provide an adjustable lamp dimmer which incorporate an ambient light sensor mounted within the dimmer housing so as to receive ambient light transmitted through the adjustment mechanism.

It is a still further object of the present invention to provide an adjustable lamp dimmer having a translucent adjustment element with an internally reflective surface that directs ambient light to the ambient light sensor mounted within the dimmer housing.

The dimmer control of the present invention is embodied for use in an automotive vehicle environment, wherein it is desirable to maintain driver comfort by maintaining a substantially constant contrast level of the illuminated instruments with respect to ambient light conditions, according to a selected setting of the dimmer adjustment mechanism.

Costs incurred during assembly, installation, or replacement are substantially reduced due to the integral nature of construction and mounting techniques employed within the vehicle. The control is a front loaded plug-in device that contains the adjustment mechanism, a variable resistor, an ambient light sensor and power control circuitry attached to a substrate material.

The adjustment mechanism has a portion which, when mounted, extends external to a housing so as to be accessible for manual adjustment. The adjustment mechanism is translucent at the external portion for receiving ambient light and conducting that received light to the internally mounted sensor. The sensor is protectively mounted in a space efficient manner and continuously monitors the ambient light level changes through the adjustment mechanism.

DETAILED DESCRIPTION OF THE PREFERRED EMBODIMENT

Although the present invention is shown in a preferred embodiment in association with a multi-position switch of the type described in our above-noted copending application, it is, of course, recognized that the principles and concepts which constitute the present invention are equally applicable to embodiments which include modifications and variations to that shown herein.

Figure 2:
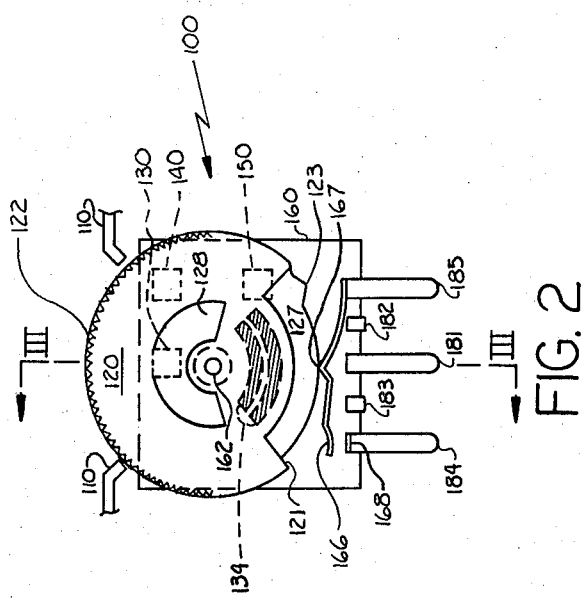
FIG. 2 is an overall view of the preferred embodiment of the present invention.
Figure 1:
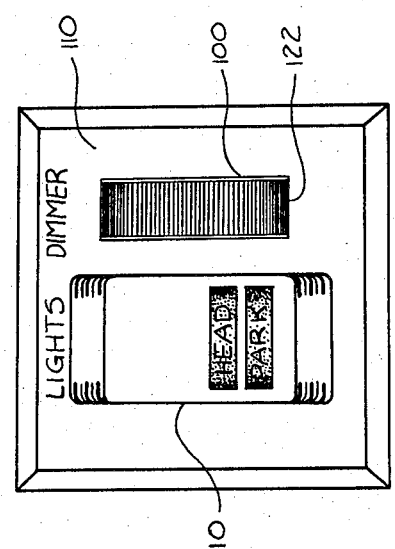
FIG. 1 is an external view of the preferred embodiment of the present invention shown along side a multi-position switch, such as that shown in our copending U.S. patent application noted above.
Figure 4:
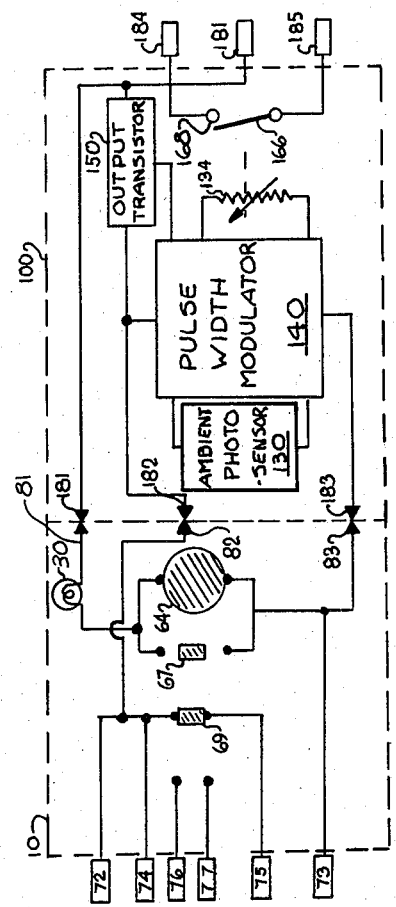
FIG. 4 is an electrical schematic of a preferred embodiment of the present invention as it is interconnected with the multi-position switch of our copending application noted above.
Figure 3:
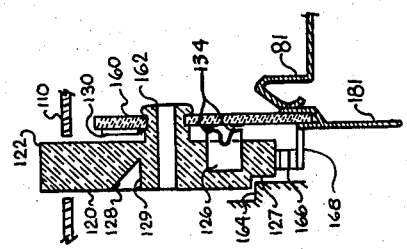
FIG. 3 is a cross-sectional view of the embodiment shown in FIG. 2 and taken along section line III—III.

Three views of the drawing illustrated in respective FIGS. 1, 2 and 3, are concurrently referred to in the following discussion.

The plug-in dimmer control assembly 100 is shown mounted within the housing having a removable bezel 110. The bezel 110 contains an opening through which a manual adjustment mechanism 120 extends outwardly therefrom. The adjustment mechanism 120 is a wheel formed of a translucent material. The outer edge of the adjustment mechanism 120 contains a large number of serrations 122 that provide a frictional surface for manual adjustment. The adjustment mechanism 120 is pivotally mounted on a support substrate 160 which may be formed from a ceramic material. In the present embodiment, a collar 162 is formed to overlap an aperture in the substrate 160 and to provide a mounting support for the rotational adjustment mechanism 120. A pair of arcuate resistive deposits 134 are formed on the substrate 160 and a wiper element 126 is embedded into the adjustment mechanism 120. The combination, of resistive deposits and wiper element, forms a variable resistor 134 wherein numerous values are selectable according to the rotational position of the adjustment mechanism 120. The resistive elements 134 are electrically connected to a pulse-width modulator logic chip 140 which is mounted on the substrate 160, along with an output transistor 150.

In the present embodiment, an on/off switch 166 is also provided. Plug-in terminals 184 and 185 at the base of the substrate 160 are bridged by a movable spring metal arm of the switch 166 which is actuated to make or break with a land 168 extending from the terminal 184. A cam 123 on the outer edge of the adjustment mechanism 120 provides the actuator to close the switch when the adjustment mechanism 120 is rotated to its full clockwise position. When the adjustment mechanism 120 is rotated counter clockwise, the switch is opened.

Other terminals 181, 182 and 183 are also provided at the base of the substrate 160 and are in compression contact with corresponding adjacent terminals extending from the adjacent multi-position switch 10.

An ambient photosensor 130 is utilized along with the variable resistor 134 to provide information to the pulse width modulator circuit 140 which is programmed to provide pulse width modulation to an output transistor 150 to drive the illuminating lamp load on terminals 181.

An ambient photosensor 130 is mounted on the substrate 160 so that it is internal to the housing 110 and integral with the plug-in dimmer control 100. In order to provide ambient light levels to the ambient photosensor 130, the translucent adjustment mechanism 120 is provided with a wedge formed by surfaces 128 and 129. The surface 128 is formed at approximately 45° with respect to the entering light path so as to provide an internally reflective surface that reflects received ambient light towards the ambient photosensor 130.

As mentioned above, the present invention is embodied in a low cost lightweight plug-in type device in an automotive vehicle to control the illumination intensity of the various gauges and instruments. Accordingly, this setting of the adjustable mechanism 120 determines the setting of the variable resistor 134. Of course the setting of the adjustment mechanism 120 is performed when the ambient light level surrounding the adjustment mechanism is at some value. The operator adjusts the variable resistor so that the intensity of illumination at the instruments is at a comfortable contrast level. Accordingly, as the ambient level within the vehicle changes, those changes are monitored by the ambient photosensor 130 and the pulse-width modulation circuit 140 will approximately adjust the illumination duty cycle for the lamp load in order that a constant contrast is maintained, based upon that setting of the adjustment mechanism 120.

Auxiliary lamps, such as dome lamps or reading lamps, are controllable for on/off operation by the switch 166 to provide power from terminal 184 to 185.

The multi-position switch 10 is a parking/headlamp switch with an internal illumination lamp 30 which derives its power from the output from the dimmer control 100 by a terminal 181 connected to terminal 81. The dimmer control 100 receives input power on terminal 182 from terminal 82 on the switch 10 when that switch is connected either in the parking lamp or head lamp position. A ground is provided to the dimmer control 100 through terminal 183, connected to terminal 83 on the switch 10.

It will be apparent that many modifications and variations may be implemented without departing from the scope of the novel concept of this invention. Therefore, it is intended by the appended claims to cover all such modifications and variations which fall within the true spirit and scope of the invention.

We claim:

1. An adjustable lamp dimmer for controlling illumination intensity of associated illuminated instruments and gauges comprising:
a housing;
a mounting substrate within said housing;
means mounted in said housing for movable adjustment on said substrate;
at least one variable resistor mounted between said substrate and said movable means for providing a different selected resistance for each adjustment thereof;
means mounted on said substrate for continuously sensing ambient light levels in the environment external to said housing of said lamp dimmer; and
means for monitoring the resistance of said variable resistor and said ambient light sensing means to provide a pulse width modulated output signal to control said illumination intensity of associated illuminated instruments and gauges as a function of sensed ambient light levels.

2. An adjustable lamp dimmer as in claim 1, wherein said monitoring means is mounted on said substrate.

3. An adjustable lamp dimmer as in claim 1, wherein said movable means is a wheel rotationally mounted on said substrate, having a translucent portion thereof continuously exposed to said ambient light; and
said sensing means is mounted to continuously sense ambient light transmitted through said translucent portion of said wheel.

4. An adjustable lamp dimmer as in claim 3, wherein said translucent wheel includes an internally reflective surface oriented to direct transmitted ambient light in said wheel toward said sensing means.

5. An adjustable lamp dimmer as in claim 1, further including an electrical switch mounted on said substrate and means on said movable adjustment means for actuating said switch.

6. An adjustable lamp dimmer as in claim 5, wherein said movable means is a wheel rotationally mounted on said substrate, having a translucent portion thereof exposed to said ambient light; and
said sensing means mounted to continuously sense ambient light transmitted through said translucent portion of said wheel.

7. An adjustable lamp dimmer as in claim 6, wherein said translucent wheel includes an internally reflective surface oriented to direct transmitted ambient light in said wheel toward said sensing means.

8. An adjustable lamp dimmer as in claim 7, wherein said dimmer is enclosed by said housing having an aperture through which said translucent portion of said rotationally mounted wheel is exposed to said ambient light.

* * * * *